(12) United States Patent
Mittal et al.

(10) Patent No.: US 10,085,029 B2
(45) Date of Patent: Sep. 25, 2018

(54) SWITCHING DISPLAY DEVICES IN VIDEO TELEPHONY

(71) Applicant: QUALCOMM Incorporated, San Diego, CA (US)

(72) Inventors: Sanjeev Mittal, San Diego, CA (US); Vikram Singh, San Diego, CA (US); Tien-Hsin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 14/805,318

(22) Filed: Jul. 21, 2015

(65) Prior Publication Data
US 2017/0026650 A1 Jan. 26, 2017

(51) Int. Cl.
*H04N 21/2343* (2011.01)
*H04N 19/154* (2014.01)
(Continued)

(52) U.S. Cl.
CPC ....... *H04N 19/154* (2014.11); *H04L 65/1096* (2013.01); *H04N 7/141* (2013.01);
(Continued)

(58) Field of Classification Search
CPC .. H04N 19/154; H04N 19/107; H04N 19/112; H04N 19/114; H04N 19/136;
(Continued)

(56) References Cited

U.S. PATENT DOCUMENTS

| 6,198,500 | B1 * | 3/2001 | Watanabe | H04N 7/152 348/E7.084 |
| 7,245,660 | B2 * | 7/2007 | Yona | H04N 7/152 348/E7.084 |

(Continued)

FOREIGN PATENT DOCUMENTS

| EP | 2552110 A1 | 1/2013 |
| JP | 2014143496 A | 8/2014 |

(Continued)

OTHER PUBLICATIONS

International Search Report and Written Opinion—PCT/US2016/042128—ISA/EPO—dated Sep. 26, 2016.

(Continued)

*Primary Examiner* — Christopher Findley
(74) *Attorney, Agent, or Firm* — Knobbe, Martens, Olson & Bear, LLP

(57) ABSTRACT

A system and method for performing video telephony (VT) is disclosed. In one example, there is provided an apparatus having a transceiver configured to receive VT data and information indicating a switch from a first display to a second display from a network. The apparatus also includes a decoder operatively coupled to the transceiver and configured to decode the VT data, a memory comprising a coded picture buffer (CPB) configured to store the decoded VT data, and a processor operatively coupled to the transceiver, the decoder, and the memory. The processor is configured to, in response to receiving the information indicating a switch (Continued)

from a first display to a second display, instruct the transceiver to transmit a request for an I-frame to the network.

30 Claims, 6 Drawing Sheets

(51) Int. Cl.

| | | |
|---|---|---|
| *H04N 19/107* | (2014.01) |
| *H04N 19/112* | (2014.01) |
| *H04N 19/114* | (2014.01) |
| *H04N 19/136* | (2014.01) |
| *H04N 19/159* | (2014.01) |
| *H04N 19/172* | (2014.01) |
| *H04N 19/177* | (2014.01) |
| *H04N 19/44* | (2014.01) |
| *H04N 19/503* | (2014.01) |
| *H04N 19/593* | (2014.01) |
| *H04N 7/14* | (2006.01) |
| *H04L 29/06* | (2006.01) |

(52) U.S. Cl.
CPC ........... *H04N 7/147* (2013.01); *H04N 19/107* (2014.11); *H04N 19/112* (2014.11); *H04N 19/114* (2014.11); *H04N 19/136* (2014.11); *H04N 19/159* (2014.11); *H04N 19/172* (2014.11); *H04N 19/177* (2014.11); *H04N 19/44* (2014.11); *H04N 19/503* (2014.11); *H04N 19/593* (2014.11)

(58) Field of Classification Search
CPC .. H04N 19/159; H04N 19/172; H04N 19/177; H04N 19/44; H04N 19/503; H04N 19/593; H04N 7/141; H04N 7/147; H04L 65/1096

See application file for complete search history.

(56) References Cited

U.S. PATENT DOCUMENTS

| | | |
|---|---|---|
| 2007/0100940 A1 | 5/2007 | Eriksson |
| 2008/0068446 A1* | 3/2008 | Barkley ................. H04N 7/147 348/14.07 |
| 2008/0218584 A1* | 9/2008 | Matsumoto ............ H04N 7/152 348/14.09 |
| 2008/0260047 A1 | 10/2008 | Hannuksela et al. |
| 2009/0252227 A1 | 10/2009 | Nepomucenoleung et al. |
| 2010/0085419 A1* | 4/2010 | Goyal ..................... H04N 7/147 348/14.09 |
| 2010/0208668 A1 | 8/2010 | Dumazy |
| 2010/0220195 A1 | 9/2010 | Li et al. |
| 2011/0164106 A1 | 7/2011 | Kim |
| 2016/0142330 A1* | 5/2016 | Yang ....................... H04L 47/32 370/231 |

FOREIGN PATENT DOCUMENTS

| | | |
|---|---|---|
| WO | WO-2007145686 A1 | 12/2007 |
| WO | WO-2015035232 A2 | 3/2015 |

OTHER PUBLICATIONS

Shen B., et al., "Dynamic Video Transcoding in Mobile Environments", IEEE Multimedia, IEEE Service Center, New York, NY, US, vol. 15. No. 1, Jan. 1, 2008 (Jan. 1, 2008), pp. 42-51, XP011206577, ISSN: 1070-986X.

* cited by examiner

SWITCHING DISPLAY DEVICES IN VIDEO TELEPHONY

TECHNICAL FIELD

The disclosure relates to video telephony (VT) and, more particularly, to maintaining VT quality while switching display devices during a VT session.

BACKGROUND

Communication devices, such as mobile phones, may include an audio capture device, such as a microphone or speech synthesizer, an audio encoder to generate audio packets (or frames), a video capture device, such as a camera, and a video encoder to generate video frames. The video frames may be transmitted between devices for use in video telephony (VT). The communication device (i.e., VT device) may use communication protocol layers, such as real-time transport protocol (RTP), radio link protocol (RLP), medium access control (MAC), and physical (PHY) layers. In a video telephony application, the communication device may place video and audio RTP packets in a RLP queue. A MAC layer module may generate MAC layer packets from contents of the RLP queue. The MAC layer packets may be converted to PHY layer packets for transmission across a communication channel to another communication device.

The systems, methods and devices of this disclosure each have several innovative aspects, no single one of which is solely responsible for the desirable attributes disclosed herein

SUMMARY

In one aspect, an apparatus for video telephony (VT) comprises a transceiver configured to receive VT data from a network, a decoder operatively coupled to the transceiver and configured to decode the VT data, a memory comprising a coded picture buffer (CPB) configured to store the decoded VT data, and a processor operatively coupled to the transceiver, the decoder, and the memory. The processor is configured to, in response to receiving a surface address associated with a display, (i) reconfigure the decoder based at least in part on the received surface address and (ii) instruct the transceiver to transmit a request for an I-frame to the network.

In another aspect, a method of performing VT comprises receiving VT data at a receiving device from a network, decoding the VT data via a decoder, storing the decoded VT data in a memory, detecting information indicating a switch from a first display to a second display and, in response to detecting the information indicating a switch from a first display to a second display, transmitting a request for an I-frame to the network.

In another aspect, a non-transitory computer readable storage medium has stored thereon instructions that, when executed, cause a processor of a device to receive VT data from a network, decode the VT data via a decoder, store the decoded VT data in a memory, and, in response to detecting information indicating a switch from a first display to a second display, transmit a request for an I-frame to the network.

In yet another aspect, a video coding device for performing VT comprises means for receiving, from a network, VT data and information indicating a switch from a first display to a second display, means for decoding the VT data, means for storing the decoded VT data, and means for transmitting a request for an I-frame to the network in response to detecting the information indicating the switch.

DETAILED DESCRIPTION

This disclosure relates to video telephony (VT) and, more particularly, to techniques for improved switching between devices during a VT session. VT generally refers to real-time communication that includes both video and audio, as opposed to traditional telephony which is audio only. During a VT session, communication devices at different locations transmit and receive packets carrying audio and video data over a network such as the internet.

Figure 1:
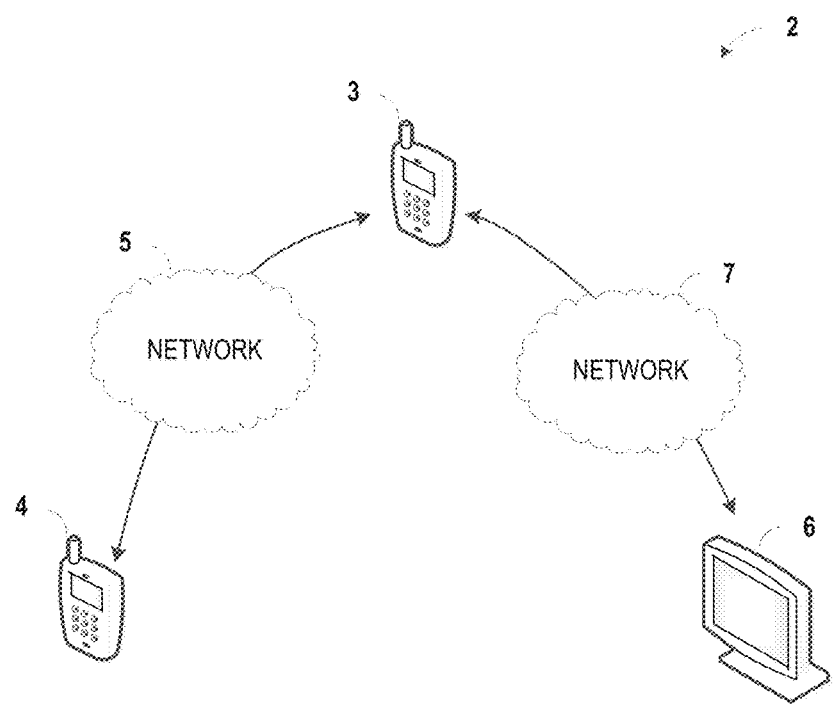
FIG. 1 illustrates an exemplary system with video telephony (VT) devices.

FIG. 1 illustrates an exemplary system with VT devices. In an embodiment, a first VT device 3 (i.e., communication device) may communicate with a second VT device 4 via a network 5. A VT device may be any device suitable for receiving and/or transmitting video information, for example a smartphone, laptop or desktop computer, tablet, etc. The first VT device 3 may also communicate with a display device 6 via a network 7. A display device 6 may be any device suitable for displaying video information, for example, a smartphone, laptop or desktop computer, tablet, television, etc.

The first and second VT devices 3, 4 may specify surface addresses for displaying received video information. For example, if a VT device is a smartphone having a display suitable for displaying video, the display may have an associated address. The VT device may specify the display address as the surface address for received video information, allowing the video information to be displayed on the display.

During a VT session, a VT device's surface address may change. For example, a user in a VT conversation on a smartphone may wish to have video displayed on a larger screen, such as a television. The user may specify the television as the desired display device 6, and the associated address of the television may be sent to the VT device as the new surface address. When a surface address changes, the audio and/or video generated at the display device 6 may experience a drop in quality from what was being generated at the VT device 3. This may be caused by the device receiving only partial information (e.g., only P- and/or B-pictures) for a period of time. Thus, systems and methods for requesting full picture information (e.g., including I-pictures) when a change of surface address occurs are desirable.

The communication devices, which may alternatively be referred to as VT devices, may be equipped for wired and/or wireless communication. The VT devices may be dedicated to VT applications or be equipped to support any of a wide variety of other computing applications such as web browsing, gaming, word processing, graphics processing, video and/or audio entertainment, and location tracking, e.g., in addition to VT applications. In some examples, the VT devices may be so-called smartphones, tablets, or wearable smart devices.

The packets generated by a VT device may, for example, be transmitted according to the Real-Time Transport Protocol (RTP) which defines a standardized packet format. Additionally, the VT devices may transmit and receive information packets according to the RTP Control Protocol (RTCP), which defines a standardized packet format for transmitting out-of-band statistics and control information for an RTP session.

To reduce the amount of data that needs to be transmitted over the network, VT devices include audio and video encoders and decoders. The video encoder of a first VT device typically compresses video data captured by a camera using a variety of video compression tools, while the video decoder of a second VT device generally performs reciprocal techniques to those of the video encoder in order to decode the encoded video data for playback at the second VT device.

Figure 2:
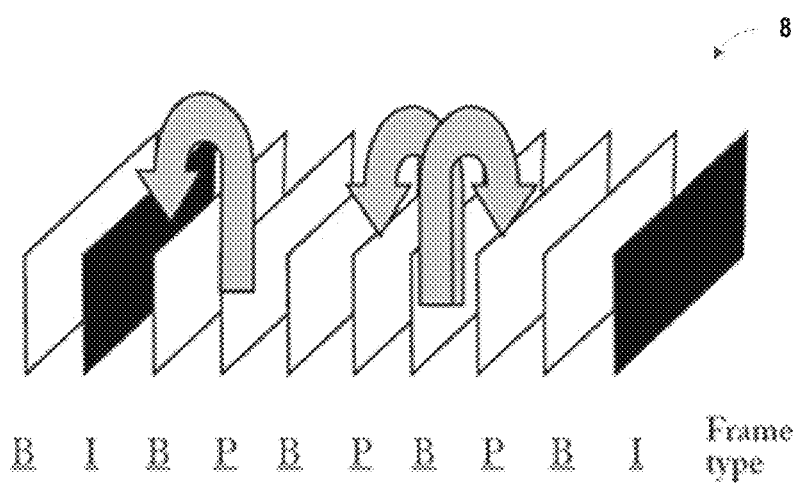
FIG. 2 illustrates frame types (i.e., picture types) that may be used in VT.

FIG. 2 illustrates frame types (i.e., picture types) that may be used in VT—namely, I-frames, P-frames, and B-frames. As used herein, the terms "picture" and "frame" may be used interchangeably. Similarly, the terms "I-picture" and "I-frame," "P-picture" and "P-frame," and "B-picture" and "B-frame" may also be used interchangeably.

The video encoder of a VT device encodes captured video as a series of pictures, where a picture may refer to a frame of video data or, in the case of interlaced video, may refer to a field of video data. The video encoder generates a series of intra-coded pictures (I-pictures or I-frames) and predicted pictures (P- or B-pictures). I-pictures can be decoded without reference to other pictures but typically provide less compression than P- and B-pictures. P- and B-pictures, in contrast, utilize information of a previously decoded picture, and thus may be more susceptible to errors, but provide more compression compared to I-pictures. A P-picture is predicted relative to another picture. A B-picture is predicted relative to two other pictures. For encoding a P- or B-picture, a greater number of coding tools are available to a video encoder than when encoding an I-picture. As one example, a block of a P-picture may be predicted based on a block in an already decoded picture, predicted based on other pixel values in the P-picture, or not predicted at all. As I-pictures do not rely on previously decoded pictures, a block in an I-picture, by contrast, cannot be predicted based on a block of an already decoded picture. Instead, a block in an I-picture is decoded based on pixels already decoded within the I-picture. The availability of fewer coding tools generally results in I-pictures providing less compression than P-pictures and B-pictures.

Successive P- or B-pictures may result in errors being propagated from one picture to the next until the video decoder receives an I-picture. Additionally, as P- or B-pictures are decoded using previously decoded pictures, a video decoder may not be able to properly decode a P- or B-picture if a picture upon which the P- or B-picture relies was not properly decoded, due, for example, to packet loss. In these instances, the video decoder may, for a few seconds, generate video that is unrecognizable or may not be able to generate any video at all until another I-picture is received. This few seconds of poor video or no video may diminish user experience. In order to improve video quality and to improve error resiliency, video encoders are typically configured to periodically include I-pictures in the encoded video bitstream, with more I-pictures typically improving video quality but reducing overall video compression and fewer I-pictures reducing video quality but improving overall video compression.

Video encoders are typically configured to generate I-pictures in response to detecting a large amount of change in the pictures being encoded. A large amount of change in pictures may, for example, occur when the camera moves, and the entire scene of one picture is different than that of recently coded pictures. In contrast, a low amount of change in pictures may occur when a camera is in a fixed position focused on objects that are only slightly moving. For example, in a VT session where the camera is focused on a fixed person or group of people, the movement of the people is typically small, and portions of the background may change slightly or not at all. In such a scenario, a VT device may increase the amount of time between I-pictures. Even in scenarios where there is no change or virtually no change in pictures, VT devices may still periodically send I-pictures in order to improve video quality and improve error resiliency.

During a VT session, one or more VT devices may switch displays. For example, a user participating in a video call via a VT device (e.g., a smartphone) may wish to switch the video to a display device (e.g., a computer monitor). While the terms "VT device" and "display device" are used, it is noted that these terms are not mutually exclusive and that many devices (e.g., smartphones, laptop/desktop computers, tablets, televisions, etc.) may be suitable for use as both VT devices and display devices. Switching may be enabled by using a wireless and/or wired connection between a VT device and a display device. For example, data may be transmitted between a VT device and a display device via a Wi-Fi network and/or a local area network (LAN).

Because display switching involves communication between a VT device and a display device, other VT devices participating in a VT session may be unaware that a switch has occurred. However, embodiments of this disclosure may employ various techniques to provide information indicative of display switching between VT devices. In this way, VT devices may request data (e.g., I-pictures) that may improve performance of a VT call during and after display switching.

As introduced above, two devices participating in a VT session may exchange RTCP messages regarding the status of the VT session. The RTCP messages may, for example, include audio-visual profile with feedback (AVPF) messages with a request for an I-picture. AVPF refers to the extended RTP profile for RTCP-based feedback. Examples of an RTCP message include requests for intra coded pictures, picture loss indication (PLI) messages, and full intra request (FIR) messages.

A first VT device may send data to a second VT device in the form of I-pictures, P-pictures, and B-pictures. One or both of the devices may display received video information to an internal or external surface. A surface may be any type of screen suitable for displaying video, for example a touchscreen, high-definition television (HDTV) screen, computer monitor, etc. For example, the second VT device (e.g., a smartphone) may include a surface for displaying video. A surface may be any type of screen suitable for displaying video, for example a touchscreen, high-definition television (HDTV) screen, etc. In such a case, the second VT device may define its internal surface as a default surface address for displaying the video information. However, during a VT session, if the second VT device receives a new surface address (e.g., from a SurfaceView component), the second device may perform decoder reconfiguration to change the surface address. Decoder reconfiguration may, for example, involve flushing a buffer that includes a previously sent I-picture. If the I-picture is flushed from the buffer, then the second VT device may not be able to properly decode subsequently sent P-pictures and B-pictures until a new I-picture is received, resulting in a period of poor video or no video. The poor video may result from the P-pictures and B-pictures being dependent on the flushed I-picture, which the second VT device no longer has stored in its coded picture buffer due to the second VT device flushing the buffer as part of the decoder reconfiguration operation. In such a scenario, the first VT device does not know that the second VT device flushed the I-picture from the buffer, and therefore, the first VT device may continue to send B- and P-pictures for several seconds, resulting in a bad user experience during those several seconds.

According to the techniques of this disclosure, in order to avoid or reduce this period of poor or no video, the second VT device may be configured to send an I-picture request message in response to detecting a decoder reconfiguration. Additionally or alternatively, the second VT device may be configured to send an I-picture request message in response to detecting a flushing of a coded picture buffer that stores decoded pictures. The I-picture request message may, for example, be a picture loss indication (PLI) message over RTCP, a full intra request (FIR) message over RTCP, or some other such type of I-picture request message. Without sending the I-picture request message, the first device would continue to code video data under the assumption that the second VT device has the flushed I-picture stored and thus can use the stored I-picture for predicting subsequent P- and B-pictures. Accordingly, the second device would not receive another I-picture until the first device sent another I-picture based on either a time between I-pictures or detected changes in the video being encoded, which may be several seconds or even up to ten seconds in some instances. By sending the I-picture request message in response to flushing its coded picture buffer, the second VT device may reduce this time without an I-picture, thus improving overall user experience by reducing the amount of time with poor video quality.

Figure 3:
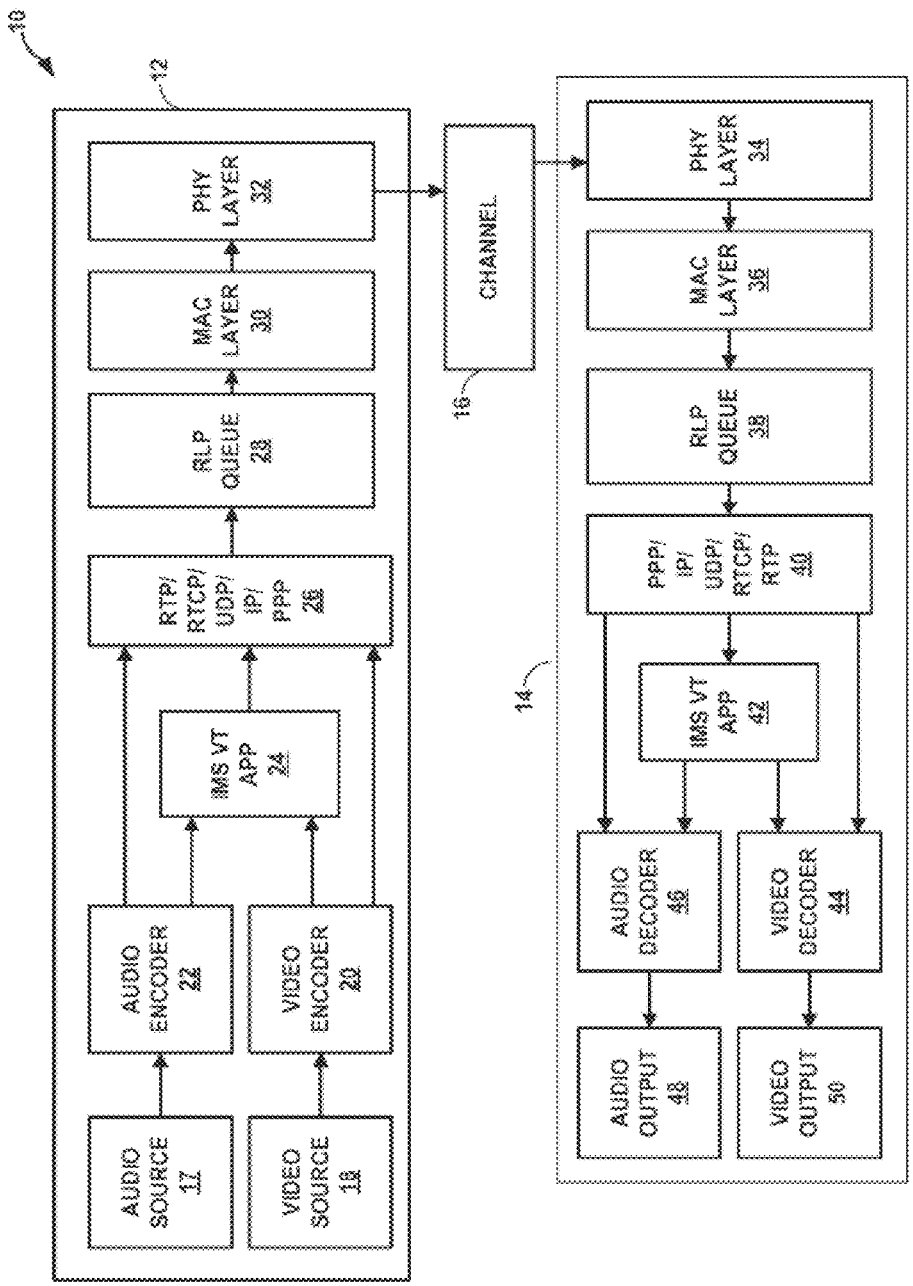
FIG. 3 illustrates a video and audio encoding and decoding system that may be provided within a communication device to support video telephony.

FIG. 3 illustrates a video encoding and decoding system 10 that may utilize the techniques of this disclosure. The system 10 includes an encoder system 12 sending data across a transmission channel 16 to a decoder system 14. The encoder system 12 may be in a first video communication device and may include an audio source 17, video source 18, video encoder 20, audio encoder 22, an Internet protocol (IP) multimedia subsystem (IMS) VT application module 24, real-time transport protocol (RTP)/RTCP/user datagram protocol (UDP)/IP/point-to-point protocol (PPP) conversion module 26, radio link protocol (RLP) queue 28, MAC layer module 30 and physical (PHY) layer module 32. In other examples, encoder system 12 may include other elements instead of or in addition to the elements shown in FIG. 1. Other examples of the encoder system 12 may include fewer elements than those shown in FIG. 1.

The decoder system 14 may be in another video communication device and may include a PHY layer module 34, MAC layer module 36, RLP queue 38, RTP/RTCP/UDP/IP/PPP conversion module 40, IMS VT application module 42, video decoder 44, audio decoder 46, audio output unit 48 and video output unit 50. In other examples, decoder system 14 may include other elements instead of or in addition to the elements shown in FIG. 1. Other examples of the decoder system 14 may include fewer elements than those shown in FIG. 1.

System 10 may provide bi-directional video and audio transmission, e.g., for VT sessions via transmission channel 16. Reciprocal encoding, decoding, and conversion modules may be provided on opposite ends of channel 16. In some embodiments, encoder system 12 and decoder system 14 may be embodied within video communication devices such as wireless mobile terminals equipped for video streaming, VT, or both. The mobile terminals may support VT according to packet-switched standards such as RTP, RTCP, UDP, IP, or PPP.

RTP/RTCP/UDP/IP/PPP conversion module 26 adds appropriate RTP/RTCP/UDP/IP/PPP header data to audio and video data received from audio encoder 22 and video encoder 20 and to control information received from IMS VT application module 24, and places the data in RLP queue 28. RTP runs on top of UDP, while UDP runs on top of IP, and IP runs on top of PPP. MAC layer module 30 generates MAC RLP packets from the contents of RLP queue 28. PHY layer module 32 converts the MAC RLP packets into PHY layer packets for transmission over channel 16.

PHY layer module 34 and MAC layer module 36 of decoding system 14 operate in a reciprocal manner. PHY layer module 34 converts PHY layer packets received from channel 16 to MAC RLP packets. MAC layer module 36 places the MAC RLP packets into RLP queue 38. RTP/RTCP/UDP/IP/PPP conversion module 40 strips the header information from the data in RLP queue 38, and reassembles the video and audio data for delivery to video decoder 44 and audio decoder 46, respectively. RTP/RTCP/UDP/IP/PPP conversion module 40 likewise strips the header information from the data in RLP queue 38 and reassembles the control information for delivery to IMS VT application module 42. Video decoder 44 and audio decoder 46 may, in conjunction with IMS VT application module 42, make video and audio decoding decisions based on the received control information. The control information may, for example, include a sender's report, based on which IMS VT application module 42 can determine if a transmission bitrate for device 12 should be altered. As part of altering the bit rate, IMS VT application module 42 may adjust the resolution at which video data is being encoded.

System 10 may be designed to support one or more wireless communication technologies such as code division multiple access (CDMA), frequency division multiple access (FDMA), time division multiple access (TDMA), or orthogonal frequency divisional multiplexing (OFDM), or another suitable wireless technique. The above wireless communication technologies may be delivered according to any of a variety of radio access technologies. For example, wireless communication may be performed according to cdma2000, wideband CDMA (WCDMA) standards, 3G, 4G, Long-Term Evolution (LTE), or any other CDMA-based air interfaces. TDMA may be delivered according to the Global System for Mobile Communications (GSM) standard. The Universal Mobile Telecommunication System (UMTS) standard permits GSM or WCDMA operation. For VT applications, system 10 may be designed to support high data rate (HDR) technologies such as cdma2000 1x EV-DO, Release 0, Revision A or subsequent EVDO releases.

The video source 18 may be a video capture device, such as one or more video cameras, one or more video archives, or a combination of video cameras and video archives. Video source 18 may further include the ability to capture, generate, and/or include computer generated graphics. The video encoder 20 generates encoded video data according to a video compression method, such as MPEG-4, ITU-T H.264/AVC (Advanced Video Coding (AVC)), or ITU-T H.265 (High Efficiency Video Coding (HEVC)). Other video compression methods may also be used, such as the International Telecommunication Union (ITU) H.263, VP9, MPEG-2, or other standardized or proprietary methods. Video encoder 20 may provide a video source rate control scheme that is generally CODEC-dependent. For example, video encoder 20 may be adapted for video encoding according to HEVC, MPEG4, ITU H.263, ITU H.264 or another standard or technique. In one example, video encoder 20 may be implemented by a digital signal processor (DSP) or embedded logic core.

The audio source 17 may be an audio capture device, such as a microphone, or a speech synthesizer device. The audio encoder 22 may encode audio data to accompany the video data. The audio data may be encoded according to an audio compression method, such as adaptive multi-rate narrow band (AMR-NB), or other techniques. For VT applications, the video will permit viewing of a party to a VT conference, and the audio will permit the speaking voice of that party to be heard.

In operation, RTP/RTCP/UDP/IP/PPP conversion module 26 obtains video and audio data packets from video encoder 20 and audio encoder 22. RTP/RTCP/UDP/IP/PPP conversion module 26 adds appropriate header information to the audio packets and inserts the resulting data within RLP queue 28. Likewise, RTP/RTCP/UDP/IP/PPP conversion module 26 adds appropriate header information to the video packets and inserts the resulting data within RLP queue 28. MAC layer module 30 retrieves data from RLP queue 28 and forms MAC layer packets. Each MAC layer packet carries RTP/RTCP/UDP/IP/PPP header information and audio or video packet data that is contained within RLP queue 28.

Audio packets may be inserted into RLP queue 28 independently of video packets. In some cases, a MAC layer packet generated from the contents of RLP queue 28 will carry only header information and video packet data. In other cases, the MAC layer packet will carry only header information and audio packet data.

In some cases, the MAC layer packet will carry header information, audio packet data and video packet data, depending on the contents of RLP queue 28. The MAC layer packets may be configured according to a radio link protocol (RLP), and may be referred to as MAC RLP packets. PHY layer module 32 converts the MAC RLP audio-video packets into PHY layer packets for transmission across channel 16.

Channel 16 carries the PHY layer packets to decoder system 14. For example, channel 16 may be a wired connection, such as a local or wide-area wired network. Alternatively, as described herein, channel 16 may be a wireless channel such as a cellular, satellite or optical channel. Channel 16 may also be a combination of wireless and wired channels.

Channel conditions may be a concern for wired and wireless channels, but are especially problematic for mobile VT applications performed over a wireless channel 16, in which channel conditions may suffer due to fading or congestion. For example, channel 16 may be characterized by a reverse link (RL) having a throughput that varies according to channel conditions. Throughput may be estimated based on channel conditions, as represented by one or more of current wireless channel transmit rate, wireless base station activity, and transmit power limitations. For example, the channel conditions may be determined based on current MAC layer data rate, a reverse activity bit (RAB), and a power amplifier (PA) limit.

Video encoder 20 may maintain a virtual video buffer representing an amount of the encoded video relative to a target encoding rate. The target encoding rate may be a maximum encoding rate specified for video packets transmitted over channel 16. Video encoder 20 may control an actual encoding rate of the video from video source 18.

PHY layer module 34 of decoder system 14 identifies the MAC layer packets from the PHY layer packets and reassembles the content into MAC RLP packets. MAC layer module 36 then reassembles the contents of the MAC RLP packets to provide video and audio packets for insertion within RLP queue 38. RTP/RTCP/UDP/IP/PPP module 40 removes the accompanying header information and provides video packets to video decoder 44 and audio packets to audio decoder 46.

Video decoder 44 decodes the video data frames to produce a stream of video data for use in driving a display device forming part of video output device 50. Audio decoder 46 decodes the audio data to produce audio information for presentation to a user, e.g., via an audio speaker forming part of audio output device 48.

Video telephony refers to real-time communication of packets carrying audio and video data between at least two devices, such as systems 12 and 14. A first VT device 12 includes a video encoder 20 that obtains video from video source 18, which may, for example, be a video camera or video archive, and generates video packets. Similarly, an audio encoder 22 in the VT device 12 obtains audio from audio source 17, which may, for example, be a microphone or speech synthesizer, and generates audio packets. The video packets and audio packets are placed in a RLP queue 28. A MAC layer module 30 generates MAC layer packets from the contents of the RLP queue 28. The MAC layer packets are converted to PHY layer packets for transmission across a communication channel 16 to a second VT device 14.

In mobile VT applications, a VT device (wireless terminal) receives PHY layer packets via a wireless forward link (FL) (i.e., "downlink") from a base station. A VT device transmits PHY layer packets via a wireless reverse link (RL) (i.e., "uplink") to a base station. Each VT device includes PHY and MAC layers to convert the received PHY and MAC layer packets and reassemble the packet payloads into audio packets and video packets. A video decoder 44 within the VT device decodes the video data for presentation to a user via a display device (video output) 50. An audio decoder 46 within the VT device decodes the audio data for output via an audio speaker (audio output) 48.

Figure 4:
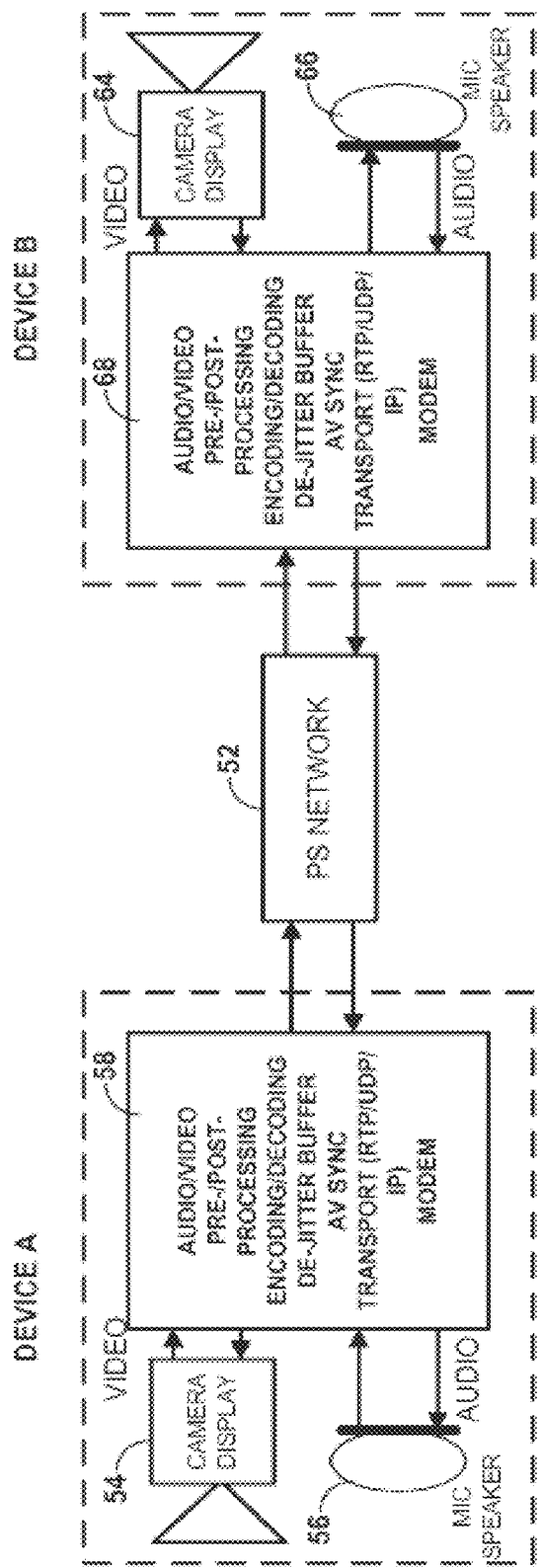
FIG. 4 depicts a simplified block diagram of a 2-way VT call over a generic packet-switched (PS) network

FIG. 4 depicts a simplified block diagram of a 2-way VT call over a generic packet-switched (PS) network 52. PS network 52 can be LTE, high-speed packet access (HSPA), evolved high rate packet data ((e)HRPD), WiFi, satellite, coax cable, power line communication, and the like, or a combination of any of the above. Devices A and B of FIG. 2 may generally be configured to conform to devices 12 and 14 of FIG. 1. On the transmit side of Device A, the audio/video of the VT call are captured at mic/speaker 56 and camera/display 54, pre-processed, if applicable, encoded/compressed, RTP/RTCP/UDP/IP packetized, and passed to the modem by processing unit 58. On the receive side of Device A, the received audio/video packets are demodulated, dis-packetized, de-jittered, decoded, AV synced and post-processed, if applicable, by processing unit 58 before sent to mic/speaker 56 and camera/display 54.

Likewise, on the transmit side of Device B, the audio/video of the VT call are captured at mic/speaker 66 and camera/display 64, pre-processed, if applicable, encoded/compressed, RTP/RTCP/UDP/IP packetized, and passed to the modem by processing unit 68. On the receive side of Device B, the received audio/video packets are demodulated, dis-packetized, de-jittered, decoded, AV synced and post-processed, if applicable, by processing unit 68 before being sent to mic/speaker 66 and camera/display 64.

Audio/video RTCP packets are also sent along with the audio/video RTP packets for AV sync, media performance related statistics, rate adaptation, and the like. RTCP packets occur less frequently than RTP packets. That is, the control information of the RTCP packets are typically signaled every 500 ms to every 2 seconds, while RTP packets occur more frequently.

During a typical two-party VT session, video may be paused one or more times in one or both directions as a result of a user action. For example, a user on either side might move a VT application to the background on the device to briefly perform some other tasks. For example, in the middle of a VT call, one of the users may use the phone camera to take a picture, quickly check email, or perform another task. As a result, the camera resource for the VT call may be released and, in this case, no video is sent over to the peer side. That is, when a user moves a VT application to the background, video is typically no longer sent to other party in the VT call. Video may be stopped because the user of the VT app in the background can no longer see a preview window that indicates what video is being transmitted. To provide for increased privacy, and to avoid sending video without notice, the VT app will typically cease sending video RTP packets. However, audio packets would continue and the VT is not dropped. The phenomenon, in which a video stream stops flowing in one or more directions, while the voice conversation continues, is typically called video pause.

FIGS. 3 and 4 show examples of systems that may implement the video telephony techniques of this disclosure. For example, a first VT device (e.g. one of device 12 or device 14 of FIG. 3 or one of Device A or Device B of FIG. 4) may be configured to receive video telephony data a second VT device (e.g. the other of device 12 or device 14 of FIG. 3 or the other of Device A or Device B of FIG. 4). The first VT device may receive a request to change display to a display device and may flush a first intra coded picture from a picture buffer. In response to receiving the request and/or flushing the first intra coded picture from the picture buffer, the first VT device and/or display device may send, to the second VT device, a request for a second intra-coded picture.

Figure 5:
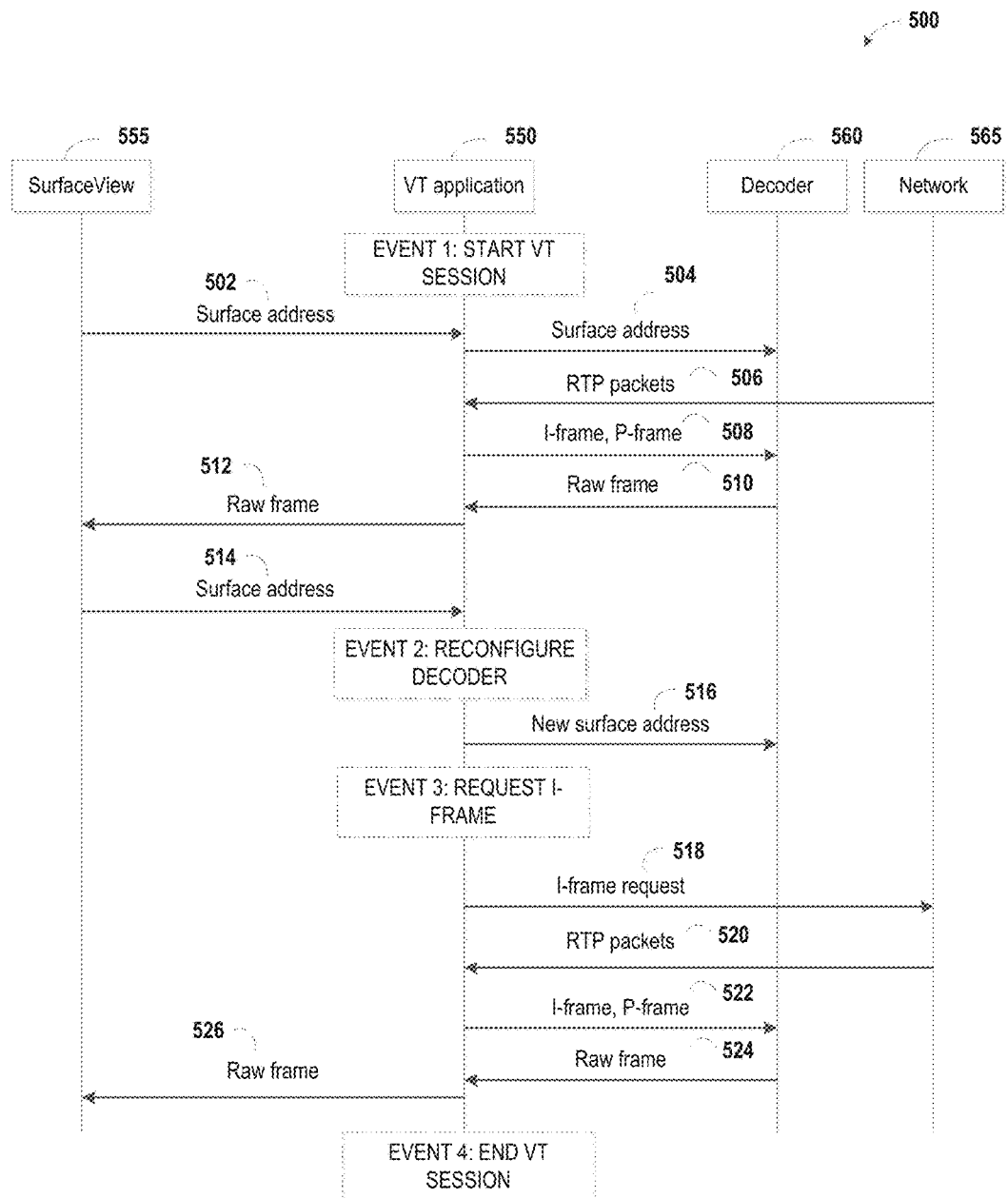
FIG. 5 illustrates call flows between multiple exemplary components.

In some embodiments, the first VT device 3 may be reconfigured based on the address of the display device 6 so that display information sent to the first VT device 3 may be displayed on the display device 6. The first VT device 3 may continue to process and/or decode the video information so that the display device 6 receives only raw video data and does not need to process the data. FIG. 5, below, provides an exemplary method of how this can be done.

FIG. 5 illustrates call flows 500 between multiple exemplary components. In one aspect, a VT application 550 may interact with a SurfaceView component 555, an OpenMax (OMX) decoder 560, and a network 565. One or more of these components may be integrated in a device, for example the first VT device 3, 12 and/or in a device configured to communicate with the first device 3, 12.

At Event 1, the VT application 550 may start a VT session. For example, the session may start as a result of a VT call between two users. The SurfaceView component 555 may receive a surface address via an android framework from a local or wireless device. The SurfaceView component 555 may send the surface address 502 to the VT application 550. For example, the surface address 502 may be indicative of the surface a VT device used in the VT call. In an embodiment, the surface address 502 may be received from an Android framework. The VT application 550 may transmit the surface address 504 to the OMX decoder 560. The OMX decoder 560 may then allocate buffers based on the surface address 504 to allow the VT application 550 to directly queue video information to the specified address.

The VT application 550 may interact with the network 565 to receive RTP packets 506. The VT application 550 may use the RTP packets to assemble frames and queue them to the OMX decoder 560. Specifically, an I-frame followed by a P-frame 508 may be queued to the OMX decoder 560 to be decoded. The OMX decoder 560 may return a raw frame 510 which may be received at the VT application 550. The VT application may then send the raw frame 512 to the SurfaceView component 555. The raw frame may be rendered directly on a surface of the first VT device 3, 12.

To switch to a new display device 6, the SurfaceView component 555 may first receive a new surface address 514 indicative of the new display device 6 and transmit it to the VT application 550. The new surface address may be received from the android framework. At Event 2, the VT application 550 may reconfigure the decoder of the first VT device and stop rendering P-frames received from a different VT device that were contained in the decoder. The VT application may transmit the new surface address 516 to the OMX decoder 560.

At Event 3, the VT application 550 may request an I-frame. Event 3 may take place after reconfiguration is complete, or alternatively, when reconfiguration begins or during reconfiguration. The VT application 550 may send a request for an I-frame 518 to the network 565. For example, the request may be an AVPF PLI or FIR message over RTCP. The network 565 may send RTP packets 520 to the VT application 550. The VT application 550 may use the RTP packets to assemble a frame and queue it to the OMX decoder 560. Specifically, an I-frame followed by a P-frame 522 may be queued to the OMX decoder 560 to be decoded.

The OMX decoder 560 may return a raw frame 524 to the VT application 560 and the VT application may transmit the raw frame 526 to the SurfaceView component 555 for rendering the raw frame on the surface of the new display device 6. At Event 4, the VT session may end.

Figure 6:
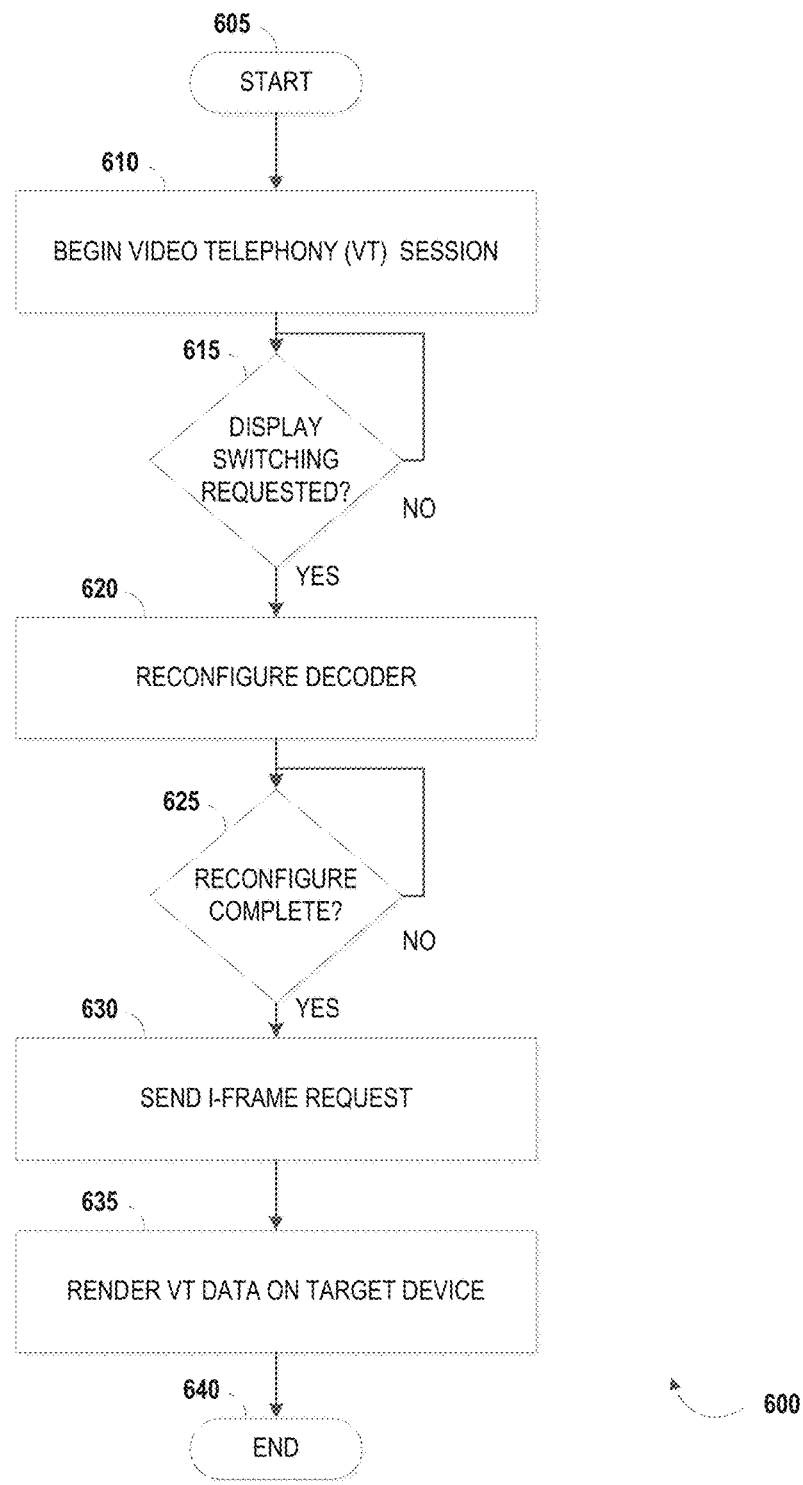
FIG. 6 is a flowchart showing an exemplary VT method according to the techniques of this disclosure.

FIG. 6 is a flowchart showing an exemplary VT method according to the techniques of this disclosure. The process 600 starts at block 605. At block 610, the process 600 may involve starting a VT session. A VT session may involve a wireless or wired connection between two or more VT devices 3, 4. A VT session may begin as a result of one VT device making a VT call to another VT device.

At decision block 615, the process may involve determining whether display switching has been requested for one of the VT devices. In an embodiment, determining whether display switching has been requested may involve determining whether a new surface address has been received. In an alternative embodiment, if a request for display switching is received without a new surface address, the process 600 may also involve requesting a new surface address. In an embodiment, if display switching has not been requested, the process 600 may involve continuously and/or periodically re-checking whether display switching is requested. Alternatively, the process 600 may involve checking for a switching request only once or a different finite number of times.

At block 620, if display switching has been requested, the process 600 may involve reconfiguring the decoder of the VT device that requested display switching. Reconfiguring the decoder may involve flushing the decoder of frames (e.g., I-frames, B-frames, and P-frames) stored in the decoder. As a result the VT device may stop rendering existing frames. Reconfiguring may also involve updating the surface address to the address of the target display device 6.

At decision block 625, the process 600 may involve determining whether reconfiguration is complete. If reconfiguration is complete, the process 600 may proceed to block 630, where the process 600 may involve sending a request for an I-frame. If reconfiguration is not complete, the process 600 may involve continuing to check if reconfiguration is complete. Alternatively, the process 600 may involve sending an I-frame request during and/or before reconfiguration. The first VT device and/or the target display device 6 may send the request for an I-frame. In one example, the I-frame request may be performed by triggering a PLI or FIR message.

At block 635, the process 600 may involve rendering VT data on the target display device 6. The data received at the target display device 6 may be raw data, such that the target display device 6 does not need to process the data. Alternatively, the target display device 6 may receive encoded data and may comprise a decoder for decoding the data before rendering it on a surface. The process 600 ends at block 640.

Figure 7:
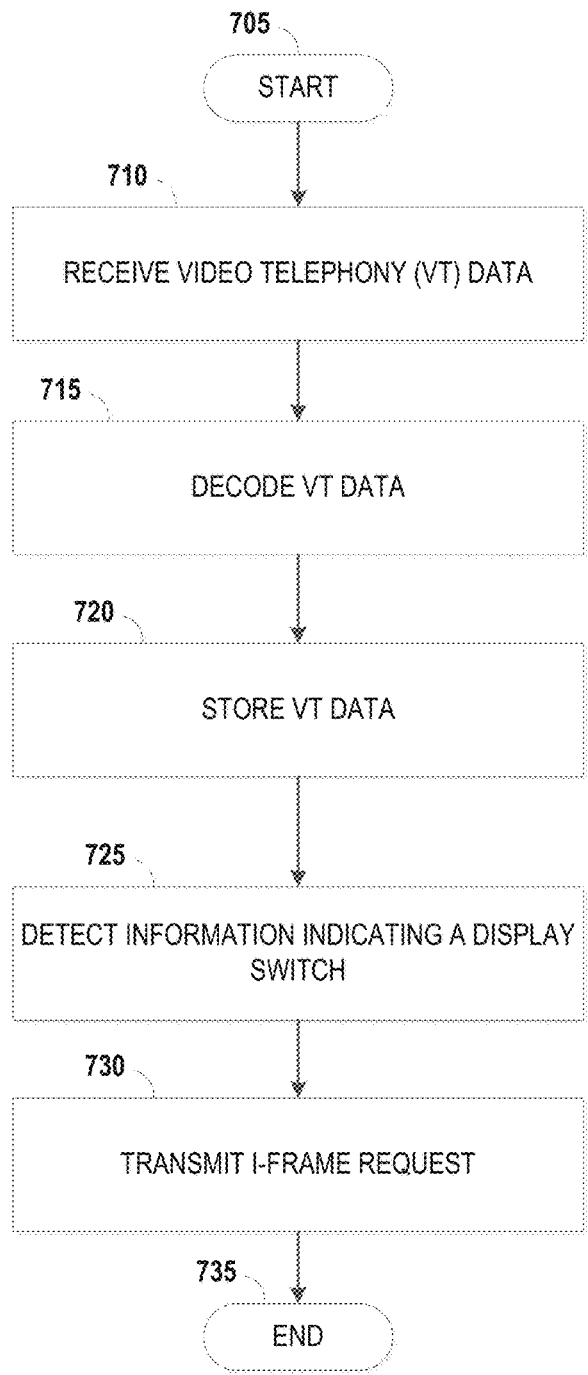
FIG. 7 is a flowchart showing another exemplary VT method according to the techniques of this disclosure.

FIG. 7 is a flowchart showing another exemplary VT method according to the techniques of this disclosure. The process 700 starts at block 705. At block 710, the process 700 may involve receiving VT data. For example, VT data may be received at a VT device 3 via a network 5.

At block 715, the process 700 may involve decoded the received VT data. As discussed above, a VT device 3 may have a decoder, for example an OMX decoder, for decoder received data.

At block 720, the process 700 may involve storing the decoded VT data. The VT may be stored, for example, in a CPB.

At decision block 725, the process 700 may involve detecting information indicating a switch from a first display to a second display. In an embodiment, detecting may comprise receiving transmitted information. For example, the information may be received at the VT device 3 via a network 5. In an embodiment, the information may be a surface address associated with the second display. A surface address may be indicative of any display surface. For example, the display surface may be integrated with a VT device 3 or a display device 6.

At block 730, the process 700 may involve transmitting an I-frame request. The I-frame request may be transmitted via a network 5. The process 700 ends at block 735

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random access memory (RAM), read-only memory (ROM), electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for video telephony (VT), comprising:
a transceiver configured to receive, over a communication network, VT data for decoding, the VT data including a first intra-coded frame;
a decoder operatively coupled to the transceiver and configured to decode the VT data for display on a first display device based on the first intra-coded frame;
a memory configured to store the VT data and decoded VT data; and
a processor operatively coupled to the transceiver, the decoder, and the memory, the processor configured to, in response to receiving a request to switch from displaying the decoded VT data on the first display device to a second display device:
clear the first intra-coded frame from the memory, and
in response to clearing the first intra-coded frame from the memory, instruct the transceiver to transmit a request for a second intra-coded frame to store in the memory,
wherein the decoder is further configured to decode the received VT data based at least in part on the second intra-coded frame into the decoded VT data to drive the second display device.

2. The apparatus of claim 1, wherein the processor is further configured to, in response to the request to switch from displaying the decoded VT data on the first display device to the second display device, reconfigure the decoder based at least in part on the request to switch.

3. The apparatus of claim 2, wherein the memory comprises a coded picture buffer (CPB).

4. The apparatus of claim 3, wherein reconfiguring the decoder comprises clearing out the CPB.

5. The apparatus of claim 1, wherein:
the transceiver is further configured to receive the second intra-coded frame over the network;
the decoder is further configured to decode the second intra-coded frame; and
the processor is further configured to instruct the decoder to drive the second display device based at least in part on the second intra-coded frame.

6. The apparatus of claim 1, wherein the second display device is associated with a display device external to the apparatus.

7. The apparatus of claim 1, wherein the request to switch from displaying the decoded VT data on the first display device to the second display device comprises a surface address associated with the second display device.

8. The apparatus of claim 7, wherein the first display device is associated with a first surface address, and wherein the processor is further configured to render at least a portion of the decoded VT data on the first display device, the surface address associated with the second display device being a second surface address.

9. The apparatus of claim 1, wherein the request for the second intra-coded frame comprises one of a Picture Loss Indication (PLI) message or a Full Intra Request (FIR) message.

10. A method operable by a video telephony (VT) device, comprising:
receiving VT data over a communication network for decoding into decoded VT data, the VT data including a first intra-coded frame;
decoding the VT data via a decoder into the decoded VT data for display on a first display device based on the first intra-coded frame;
storing the VT data and decoded VT data in a memory;
detecting a request to switch from displaying the decoded VT data on the first display device to a second display device; and
in response to detecting the request:
clearing the first intra-coded frame from the memory,
in response to clearing the first intra-coded frame from the memory, transmitting a request for a second intra-coded frame to store in the memory, and
decoding the received VT data based at least in part on the second intra-coded frame into the decoded VT data to drive the second display device.

11. The method of claim 10, further comprising, in response to detecting the request to switch from displaying the decoded VT data on the first display device to the second display device, reconfiguring the decoder based at least in part on the request to switch.

12. The method of claim 11, wherein the memory comprises a coded picture buffer (CPB).

13. The method of claim 12, wherein reconfiguring the decoder comprises clearing out the CPB.

14. The method of claim 10, further comprising:
receiving the second intra-coded frame from the network;
decoding the second intra-coded frame; and
driving the second display device based at least in part on the decoded second intra-coded frame.

15. The method of claim 10, wherein the second display device is associated with a display device external to the VT device.

16. The method of claim 10, wherein the request comprises a surface address associated with the second display device.

17. The method of claim 16, further comprising rendering at least a portion of the decoded VT data on the first display device, wherein the first display device is associated with a first surface address, and wherein the surface address associated with the second display device is a second surface address.

18. The method of claim 10, wherein the request for the second intra-coded frame comprises one of a Picture Loss Indication (PLI) message or a Full Intra Request (FIR) message.

19. A non-transitory computer readable storage medium having stored thereon instructions that, when executed, cause a processor of a device to:
receive video telephony (VT) data over a communication network for decoding into decoded VT data, the VT data including a first intra-coded frame;
decode the VT data via a decoder into the decoded VT data for display on a first display device based on the first intra-coded frame;
store the VT data and decoded VT data in a memory;
detect a request to switch from displaying the decoded VT data on the first display device to a second display device; and
in response to detecting request:
clear the first intra-coded frame from the memory,
in response to clearing the first intra-coded frame from the memory, transmit a request for a second intra-coded frame to store in the memory, and
decode the received VT data based at least in part on the second intra-coded frame into the decoded VT data to drive the second display device.

20. The non-transitory computer readable storage medium of claim 19, further having stored thereon instructions that, when executed, cause the processor to, in response to detecting the request, reconfigure the decoder based at least in part on the request to switch.

21. The non-transitory computer readable storage medium of claim 19, wherein the memory comprises a coded picture buffer (CPB).

22. The non-transitory computer readable storage medium of claim 19, further having stored thereon instructions that, when executed, cause the processor to:
receive the second intra-coded frame over the network;
decode the second intra-coded frame; and
drive the second display device based at least in part on the decoded second intra-coded frame.

23. The non-transitory computer readable storage medium of claim 19, wherein the comprises a surface address associated with the second display device.

24. A video coding device for performing video telephony (VT), comprising:
means for receiving VT data over a communication network for decoding into decoded VT data, the VT data including a first intra-coded frame;
means for decoding the VT data into the decoded VT data for display on a first display device based on the first intra-coded frame;
means for storing the VT data and decoded VT data;
means for detecting a request to switch from displaying the decoded VT data on the first display device to a second display device;
means for clearing the first intra-coded frame from the means for storing the decoded VT data in response to detecting the request;
means for transmitting a request a second intra-coded frame to store in the memory in response to clearing the first intra-coded frame from the memory;
means for decoding the received VT data based at least in part on the second intra-coded frame into the decoded VT data to drive the second display device.

25. The video coding device of claim 24, further comprising means for reconfiguring the means for decoding, in response to detecting the request based at least in part on the request.

26. The video coding device of claim 24, further comprising:
means for receiving the second intra-coded frame from the network;
means for decoding the second intra-coded frame; and
means for driving the second display device based at least in part on the decoded second intra-coded frame.

27. The video coding device of claim 24, wherein the request comprises a surface address associated with the second display device.

28. The video coding device of claim 27, wherein the surface address is indicative of a display device external to the video coding device.

29. The video coding device of claim 27, further comprising means for rendering at least a portion of the decoded VT data on the first display device associated with a first surface address, wherein the surface address associated with the second display, device is a second surface address.

30. The video coding device of claim 24, wherein the request for the display second intra-coded frame comprises one of a Picture Loss Indication (PLI) message or a Full Intra Request (FIR) message.

* * * * *